US012609930B2

(12) United States Patent (10) Patent No.: US 12,609,930 B2
Guionneau et al. (45) Date of Patent: Apr. 21, 2026

(54) METHOD AND SYSTEM FOR AUTHENTICATING A USER WITH AN AUTHENTICATION SERVER

(71) Applicant: BULL SAS, Les Clayes-sous-bois (FR)

(72) Inventors: Christophe Guionneau, Grenoble (FR); Mamuye Samuel, Grenoble (FR)

(73) Assignee: BULL SAS, Les Clayes-sous-Bois (FR)

( * ) Notice: Subject to any disclaimer, the term of this patent is extended or adjusted under 35 U.S.C. 154(b) by 123 days.

(21) Appl. No.: 18/539,800

(22) Filed: Dec. 14, 2023

(65) Prior Publication Data

US 2024/0205222 A1 Jun. 20, 2024

(30) Foreign Application Priority Data

Dec. 15, 2022 (EP) .................................... 22306883

(51) Int. Cl.
*H04L 9/40* (2022.01)
(52) U.S. Cl.
CPC ...... *H04L 63/0876* (2013.01); *H04L 63/0435* (2013.01); *H04L 63/0823* (2013.01)
(58) Field of Classification Search
CPC .................................................... G06F 21/602
See application file for complete search history.

(56) References Cited

U.S. PATENT DOCUMENTS 9,237,021 B2 * 1/2016 Mills ..................... H04L 9/3268
2014/0096220 A1 4/2014 Pinto et al.

| | | |
|---|---|---|
| 2015/0220718 A1 | 8/2015 | Hong et al. |
| 2016/0189147 A1 | 6/2016 | Vanczak |
| 2016/0191506 A1 | 6/2016 | Wang |
| 2019/0164156 A1 * | 5/2019 | Lindemann ......... H04L 63/0861 |
| 2020/0137044 A1 * | 4/2020 | Shimazawa ........... H04L 63/083 |

FOREIGN PATENT DOCUMENTS

| EP | 2020797 A1 * | 2/2009 | ......... H04L 63/0428 |
|---|---|---|---|
| WO | 2014/151556 A1 | 9/2014 | |

OTHER PUBLICATIONS

European Search Report and Written Opinion issued in EP22306883.4 on May 24, 2023 (10 pages).

* cited by examiner

*Primary Examiner* — Simon P Kanaan
(74) *Attorney, Agent, or Firm* — ARC IP Law, PC; Joseph J. Mayo

(57) ABSTRACT

The invention relates to a method for authenticating a user in a first device, the method including sending, by an authentication client of the first device or the application, to an authentication server, an authentication request. The method also includes, in response to the authentication request, sending by the authentication server a first message comprising an authentication URL and a transaction identifier, opening the URL in a web browser running on a second user device, previously enrolled with the authentication server, and verifying the identity of the user by the second user device. The method also includes, when the verification is successful, providing by the second user device to the authentication server, a proof of enrollment stored in the second device during the enrollment of the second device, in order to authenticate the user. The invention also relates to a computer program and a system implementing such a method.

13 Claims, 4 Drawing Sheets

METHOD AND SYSTEM FOR AUTHENTICATING A USER WITH AN AUTHENTICATION SERVER

This application claims priority to European Patent Application Number 22306883.4, filed 15 Dec. 2022, the specification of which is hereby incorporated herein by reference.

BACKGROUND OF THE INVENTION

Field of the Invention

At least one embodiment of the invention relates to a method for authenticating a user, with a second user device, in order to authorize the access of said user to a first device or to an application with said first user device. At least one embodiment of the invention also relates to a computer program and a system implementing such a method.

The field of the invention is the field of authenticating a user with an authentication server in order to open a session for accessing a device, or a session for accessing an application with said device.

Description of the Related Art

The access of a user to his/her workstation, or to a local application running on his/her workstation, or else to a web application via his/her workstation, requires authentication of the user. Conventional authentication mechanisms rely on the use of authentication data generally comprising an identifier and a password.

However, the weakness of password use has been well documented. To increase authentication security, a multi-factor authentication mechanism has been put into place, based on the principle of "something you know, something you have". Such a mechanism can involve an "object you have", such as a smartphone, in the authentication chain, optionally in addition to the use of a password, which considerably increases authentication security.

One type of multi-factor authentication mechanism uses a smartphone, and more generally a smart object, as the "object you have". This type of mechanism is not secure enough because it is based on single-use codes sent to the user's smartphone, transiting over an unmanaged third-party infrastructure.

Another type of multi-factor authentication mechanism implements a dedicated device, such as a USB key or a card box, as an alternative to the smartphone. This dedicated device generates a single-use code locally. Although more secure, this type of mechanism is more expensive and more cumbersome to deploy.

Yet another type of multi-factor authentication mechanism is based on push-type notifications displayed on a dedicated application installed on the smartphone. This type of mechanism, while remaining cumbersome and expensive, suffers from a lack of security because it risks overwhelming the user with a multitude of notifications, leading the user to erroneously validate a fraudulent authentication request.

One aim of one or more embodiments of the invention is to solve at least one of the above-mentioned shortcomings.

Another aim of one or more embodiments of the invention is to propose a user authentication solution that is more secure compared to the authentication mechanism using a smart object.

It is also an aim of one or more embodiments of the invention to propose a user authentication solution that is less expensive and less cumbersome to be deployed compared to the authentication mechanisms using a dedicated device.

It is additionally an aim of one or more embodiments of the invention to propose a user authentication solution that is more secure while also being less expensive and less cumbersome to deploy.

BRIEF SUMMARY OF THE INVENTION

At least one embodiment of the invention makes it possible to achieve at least one of the above-mentioned aims by a method for authenticating a user with an authentication server, in order to access a first user device, or an application with said first device, said method comprising at least one iteration of an authentication phase comprising the following steps:

- sending, by an authentication client of said first device or said application, to said authentication server, an authentication request,
- in response to said authentication request, sending by the authentication server a first message comprising an authentication URL and a transaction identifier,
- opening said URL in a web browser running on a second user device, previously enrolled with said authentication server,
- verifying the identity of said user by said second user device, and
- when said verification is successful, providing by said second user device to said authentication server, a proof of enrollment stored in said second device during the enrollment of said second device, in order to authenticate said user.

In other words, at least one embodiment of the invention proposes, for a user seeking to open a session for accessing a first user device, or seeking to access an application on a first device, to perform this authentication on a second user device, similarly to the multi-factor authentication mechanisms of the state of the art using a smart object such as a smartphone. However, unlike these authentication mechanisms, at least one embodiment of the invention proposes to enroll the second device with the authentication server and to store, locally on said second device, a proof of enrollment that can then be used during one or more authentications of the user. Thus, one or more embodiments of the invention allows more secure authentication because it avoids the use of an unmanaged third-party infrastructure, or of a dedicated application sending push notifications that may overwhelm the user.

In addition, at least one embodiment of the invention enables authentication that is less cumbersome and less expensive to implement because it avoids the use, on the user side, of a dedicated device or of a dedicated application since the authentication of the user on the second user device is done via a web browser, conventionally installed on any smart device such as a smartphone or tablet.

One or more embodiments of invention can be implemented to authenticate a user with a view to allowing said user to access the first device. In this case, the authentication makes it possible to open a session on the first device, that is to say, to authorize the user to use said first device. In other words, at least one embodiment of the invention is implemented before the user has accessed the first device.

In at least one embodiment, the authentication client may be an authentication client of the first device and installed on said first device.

In one or more embodiments, a request to access said first device can be formulated directly with the authentication client, or via an interface, or an access client, in communication with the authentication client.

At least one embodiment of the invention can be implemented to authenticate a user with a view to allowing said user to access a so-called local application installed on said first device. In this case, at least one embodiment of the invention is implemented after the user has accessed the first device.

In one or more embodiments, the authentication client can be an authentication client of the local application, and installed on said first device.

In at least one embodiment, a request to access the local application can be formulated directly with the authentication client, or via an interface, or an access client, in communication with the authentication client.

At least one embodiment of the invention can be implemented to authenticate a user with a view to allowing said user to access an application, referred to as remote application or web application, hosted on an application server accessible via a communication network, such as the Internet. In this case, at least one embodiment of the invention is implemented after the user has accessed the first device.

In one or more embodiments, the authentication client may be an authentication client of the remote application, installed on said application server.

The web application can be accessible via a web browser running on the first device. In this case, a request to access said remote application can be formulated via said web browser.

Alternatively, or in addition, the web application can be accessible via a client module installed on the first device. In this case, a request to access said remote application can be formulated via said client module.

According to one or more embodiments, the method may comprise, before the first iteration of the authentication phase, a phase of enrolling the second device with the authentication server in association with the user, said enrollment phase producing a proof of enrollment stored in said second user device.

The enrollment phase can be repeated for several second user devices so as to enroll several user devices that can be used in the method according to one or more embodiments of the invention. For example, the user can enroll a smartphone and a tablet as second user devices in order to be able to use either of them during an authentication phase. In this case, the enrollment phase is carried out individually and independently for each user device, namely for the tablet and for the smartphone.

The proof of enrollment is specific and individual for each second user device.

The proof of enrollment can be any type of proof that can be used during an authentication phase.

According to one or more embodiments, the proof of enrollment can be a single-use token, or preferably a reusable token, an authentication certificate, etc.

The proof of enrollment can be produced directly by the authentication server and transmitted to the second user device. Alternatively, in at least one embodiment, the proof of enrollment can be produced by the second user device using data provided by the authentication server.

The enrollment phase can perform an enrollment according to any enrollment technique.

According to one or more embodiments, the enrollment phase can perform a FIDO-type enrollment with the authentication server, the private key of which is recorded in the second device. In this case, the proof of enrollment is the private key stored in the second user device, and for which a public key is stored in the authentication server.

According to one or more embodiments, the enrollment phase can perform an X.509 client certificate type enrollment, the name and/or serial number of which are recorded in the authentication server, and the private key of which is recorded in the second device.

According to one or more embodiments, the enrollment phase may further comprise storing, in said second user device, an identifier of said user.

In this case, the identifier of the user may be stored in the second user device, in association with the proof of enrollment.

Alternatively, by way of at least one embodiment, the identifier of the user may not be recorded in association with the proof of enrollment. This makes it possible to use the enrolled second device for several users, or user identifiers.

The enrollment phase can preferably be carried out via an enrollment web page open in a browser running on the second user device.

A URL address of the enrollment page can be encoded in a QR code and scanned by the second user device in order to launch said enrollment page. The QR code can be displayed on the first user device, or on an Internet page of the authentication server, or on any other device.

In at least one embodiment, the user accesses, with a device other than the second user device, a web page of the authentication server and indicates his/her intention to perform an enrollment phase of a second user device, for example by pressing a button displayed on this page. The authentication server generates a QR code comprising the URL address of the enrollment page: this QR code is scanned by the second user device, which launches the display of the enrollment page in a browser of the second device.

Typically, the aim of the enrollment phase is to establish a link between the user and the second user device so that said second user device can be used as "object you have" in the context of a strong authentication.

To do this, by way of at least one embodiment, the identifier of the user can be stored with an enrollment datum, or identifier, in the authentication server. When the proof of enrollment stored in the second user device is a private key, then the enrollment data or identifier stored in the authentication server in association with the identifier of the user comprises, or consists of, the public key associated with said private key.

According to one or more embodiments, the first message can be transmitted by the authentication server, directly to the second user device.

In this case, the second device accesses the authentication URL and the transaction identifier that are found in the first message thus received.

Alternatively, or in addition, in at least one embodiment, the first message can be transmitted by the authentication server to the authentication client.

In this case, the authentication URL and the transaction identifier can be transmitted by said authentication client to the second device.

If the authentication client is located on the first device, then the first message is sent by the authentication server to said first device. The authentication URL and the transaction identifier can then be transmitted by said first device to said second device.

If the authentication client is located on the application server, then the first message is sent by the authentication server to said application server. The authentication URL and the transaction identifier can then be transmitted by said application server to said second device, directly or by means of another device, such as the first device for example.

Thus, independently of the location of the authentication client, the authentication URL and the transaction identifier can be transmitted to the second device by the first device.

Further, independently of the location of the authentication client, the transaction URL and the transaction identifier can be transmitted to the second device in different ways:

either by transmitting said first message to said second device in its entirety; or the transaction URL and the transaction identifier can first be extracted from said first message, and transmitted to the second device.

Typically, the authentication URL and the transaction identifier can be transmitted to the second user device in any form, such as for example in the form of an email, a telephone message, etc.

The authentication URL and the transaction identifier can be transmitted to the first user device:

via a communication network, for example such as the Internet; or via a local connection between the first and second devices, in particular when they are transmitted to the second device by the first device, for example a local connection of the Bluetooth type, in particular.

According to one or more embodiments, the transmission of the authentication URL and the transaction identifier to the second device can be carried out via a QR code displayed on said, or by said, first user device and scanned by said second user device. In this case, the QR code comprises the authentication URL and the transaction identifier, and optionally other data, such as for example data contained in the first message.

The QR code can be generated by the first device. Alternatively, the QR code can be generated by:

the authentication server, or the authentication client;

and transmitted to the first device and displayed by the first device.

According to one or more embodiments, the step of verifying the identity of the user by the second device can comprise providing, by said user to said second device, a security data previously stored in said second device, such as for example a password, or a biometric datum, to unlock said second device.

It should be noted that the step of verifying the identity of the user by the second device is carried out based on the data previously stored in said second device, without any interaction with the authentication server. This verification step is completely independent of the authentication server.

In at least one embodiment, this verification step aims to verify that the user is authorized to use the second device.

This verification step is preferably carried out locally in said second device.

According to one or more embodiments, the authentication phase may comprise, after a successful verification of the identity of the user by the second device, a step of sending, by said second device to said authentication server, a second message comprising:

the transaction identifier, and a proof of enrollment associated with said second device, and optionally a user identifier and/or a proof of verification.

Indeed, when the identity of the user is successfully verified by the second device, the latter uses the proof of enrollment, optionally in association with a user identifier stored in said user device, or provided by the user, to confirm the identity of the user to the authentication server. The proof of enrollment and the transaction identifier (and optionally the identity of the user and/or a proof of verification of the identity of the user) are then provided to the authentication server. The latter can then verify the proof of enrollment. If the latter is valid then the authentication server retrieves the authentication request with the transaction identifier and considers the user as identified.

According to one or more embodiments, the second message may further comprise contextual data relating to the verification of the identity of the user such as, for example:

a nature of the data used to verify the identity of the user: password, biometric data, etc.;

a verification protocol used;

a verification time data;

a geolocation data of the second device at the time of verification, the operating system of the second device;

etc.

According to one or more embodiments, following a successful authentication, the authentication phase may comprise a step of confirming authentication, by the authentication server.

This confirmation step may comprise sending by said authentication server to the authentication client, a third message comprising an authentication confirmation data and optionally an identifier of the user.

Thus, the authentication client that is in the second device, and/or in the application server, receives a confirmation for the authentication request. This confirmation can be used to:

allow this user to access the application, i.e. the local application or the web application, for example by opening a session of the application for the user; or allow this user to access the first device, for example by opening a session for this user to access said first device.

The method according to at least one embodiment of the invention may comprise, following the authentication phase, a step of opening, for the user, a session for accessing the, local or remote, application, or the first device, in the event of successful authentication.

This opening of sessions can be carried out according to any type of known mechanisms.

The identifier of the user, also referred to as identifier of user or user identifier, can be provided by the user at the start, or during, the authentication phase. The identifier may be provided to the first user device, and/or to the second user device.

Alternatively, by way of at least one embodiment, the identifier of the user can be stored in the first user device, and/or the second user device, and/or in the authentication server or even in the authentication client. In this case, the user identifier may have been provided during a previous authentication phase or during an enrollment phase.

When the user identifier is known to the first user device (either because it is provided by the user during the current authentication phase or because it has been previously stored), said user identifier can be transmitted by said first user device to the second user device, for example in the first message. The user identifier then becomes known to the second user device, which can optionally store it in said second device. This user identifier can then be communicated by the second user device to the authentication server, for example in the second message.

When the user identifier is known to the second user device:

either because it has been provided by the user, or by the first device, during the current authentication phase, or because it has been previously stored, for example during an enrollment phase or during a previous authentication phase, said user identifier may optionally be stored in said second device. This user identifier can then be communicated by the second user device to the authentication server, for example in the second message.

According to at least one embodiment of the invention, a computer program is proposed comprising computer instructions, which when they are executed by a computer, implement the steps of the authentication method according to one or more embodiments of the invention.

The computer program can be in machine language, in C, C++, JAVA, Python, and more generally any type of computer language.

The computer program can be a single program, or a set of several programs communicating together. For example, the computer program may comprise:

a server module running on the authentication server, a first client module running on the first user device, and optionally a second client module on the second user device.

According to at least one embodiment of the invention, it is proposed a system for authenticating a user with an authentication server, in order to access:

a first user device, or an application with said first device;

said system comprising:

a first user device, an authentication server, a second user device comprising a web browser, and an authentication client;

configured to implement all the steps of the authentication method according to one or more embodiments of the invention.

In at least one embodiment, the first user device may be a computer, a tablet, a smartphone, a smart television, a smart watch, a smart vehicle, etc.

In one or more embodiments, the second user device may be a computer, a tablet, a smartphone, etc. In at least one embodiment, the second user device is a portable device such as a smartphone, or a tablet.

The system may further comprise an application server, in the case where it is used to access a remote application hosted on said application server.

In every case, the system comprises an authentication client, provided in software form.

This authentication client can be installed:

on the first user device, when the system according to one or more embodiments of the invention is used to authenticate the user with a view to accessing said first device, or a local application or even a remote application;

on an application server, when the system according to one or more embodiments of the invention is used to authenticate the user with a view to accessing a remote application hosted on said application server.

BRIEF DESCRIPTION OF THE DRAWINGS

Other benefits and features shall become evident upon examining the detailed description of one or more embodiments, and from the enclosed drawings in which.

DETAILED DESCRIPTION OF THE INVENTION

It is clearly understood that the one or more embodiments that will be described hereafter are by no means limiting. In particular, it is possible to imagine variants of the one or more embodiments of the invention that comprise only a selection of the features disclosed hereinafter in isolation from the other features disclosed, if this selection of features is sufficient to confer a technical benefit or to differentiate the one or more embodiments of the invention with respect to the prior state of the art. This selection comprises at least one preferably functional feature without structural details, or only has a portion of the structural details if that portion only is sufficient to confer a technical benefit or to differentiate the one or more embodiments of the invention with respect to the prior state of the art.

In the figures, the same reference has been used for the features that are common to several figures.

Figure 1:
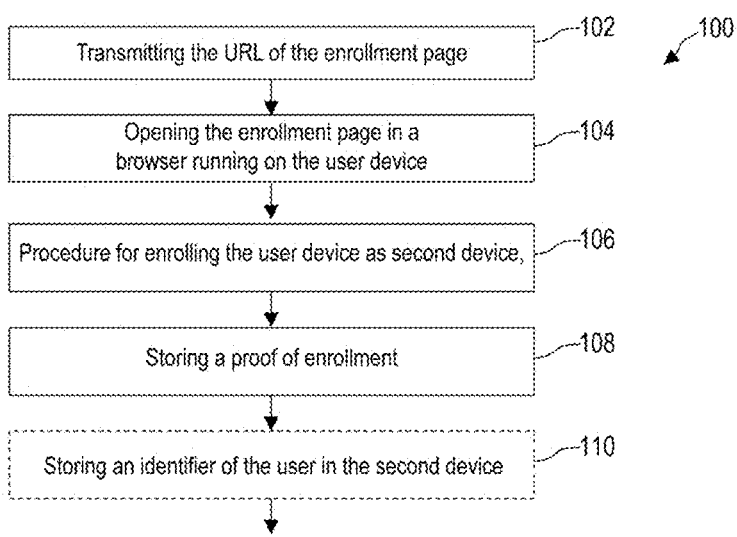
FIG. 1 is a schematic depiction of an enrollment phase that can be implemented in an authentication method according to one or more embodiments of the invention.

FIG. 1 is a schematic depiction of an enrollment phase that can be implemented in an authentication method according to one or more embodiments of the invention.

The enrollment phase 100, depicted in FIG. 1, can be implemented to enroll a user device as second device within the scope of at least one embodiment of the invention.

According to one or more embodiments, the enrollment phase 100 can be carried out independently of an authentication phase, that is to say, without initiating an authentication phase.

In one or more embodiments, the enrollment phase 100 can be carried out at the start of, or just before, an authentication phase, for example following the step of sending an authentication request. In this case, the user triggers the execution of the enrollment phase 100. Alternatively, when no user device has yet been enrolled for a user, the enrollment phase 100 can be proposed or executed automatically.

In every case, the enrollment phase 100 is carried out individually for a user device and can be repeated as many times as desired in order to enroll several user devices as second devices.

The enrollment phase 100 is carried out via an enrollment web page of the authentication server.

During a step 102, the URL of the enrollment page is communicated to the user device to be enrolled as second device. The URL of the enrollment page can be communicated to the user device in any known way. According to at least one embodiment, the URL can be communicated to the user device by a message sent to the second user device, such as for example an email or a telephone message: in this case, the user has communicated an email address or a telephone number, respectively, associated with the user device. According to at least one embodiment, the URL can be encoded in a QR code scanned by the user device. The QR code can be generated and displayed by the authentication server, for example in a browser running on a device other than the user device. According to at least one embodiment, the URL can be displayed in a page of the authentication server, such as for example a home page.

Optionally, it may be desirable to ensure that the user is authorized to enroll a device. In this case, the URL can be protected by strong authentication, such as for example by a password followed by a one-time password (OTP). Alternatively, or in addition, the URL may itself comprise a unique code, in particular when the URL is available in the form of a QR code.

During a step 104, the user device opens the URL of the enrollment page in a web browser.

Opening the enrollment page triggers the execution of an enrollment procedure carried out during a step 106.

The enrollment procedure can, for example, be an enrollment procedure allowing the user device to be registered as FIDO key. In this case, a series of interactions according to the WebAuthn protocol between the web browser of the user device and the authentication server generates a pair of keys dedicated to the connections to the authentication server. The FIDO implementation (WebAuthn) may differ from one device to another based on the version of the user device and the model; in some cases the use of the FIDO key can be protected by fingerprint, facial recognition, or PIN code/pattern. The FIDO/WebAuthn protocol records the public key of the authentication server in the browser; it will be compared and used during the authentication phase using the user device as second device.

The enrollment procedure may not be an enrollment that allows the second device to be used as FIDO key, but rather an enrollment of the certificate type, such as an X.509 client certificate, the name/serial number of which is recorded by the authentication server, and the private key of which is recorded in, and preferably protected by, the user device. In this case, the certificate constitutes the proof of enrollment and its use, during an authentication phase, will be conditioned to a local authentication of the user on the second device.

In every case, during this enrollment procedure of the second device, the user provides his/her identification data, such as for example his/her identifier and password. These identification data are already known to the authentication server. They allow the authentication server to confirm the identity of the user and also to indicate the user with which this second device is associated.

After the enrollment step 106, during a step 108, a proof of enrollment is stored locally in the user device, for example a permanent cookie, a key or a certificate, stored locally in the web browser running on the user's device. The proof of authentication can be provided in a form other than those indicated.

In addition, during this step 108, a proof of enrollment of the second device, for example a public key, is stored in association with the identifier of the user in the authentication server.

Optionally, during a step 110, carried out at the same time or just after the step 108, information containing the identifier of the user can be stored in the local storage of the web browser. This makes it possible not to have to request this identifier again during an authentication phase. These data can be encrypted by the authentication server in order to avoid being extracted from the browser. According to at least one embodiment, an opaque identifier can also be recorded according to the available FIDO mechanisms, it will be automatically transmitted during a FIDO authentication and will be used to establish the link with the real identifier of the user.

The user device can then be used as a second device during one or more iterations of an authentication phase according to one or more embodiments of the invention.

The user can enroll several user devices to use them as second user device. To do this, steps 102-110 must be repeated for each user device.

The authentication server may comprise a user interface making it possible to add a new second device or to remove a previously enrolled second device.

Preferably, at least one second device is a smartphone or a tablet.

Of course, other information/data may be exchanged between the authentication server and the second device during the enrollment phase, such as, for example, the nature of the device, the type of operating system used by the device, the date, the time, the geolocation of the device, an identifier of the web application for which the second device can be used during an authentication phase, etc.

Figure 2:
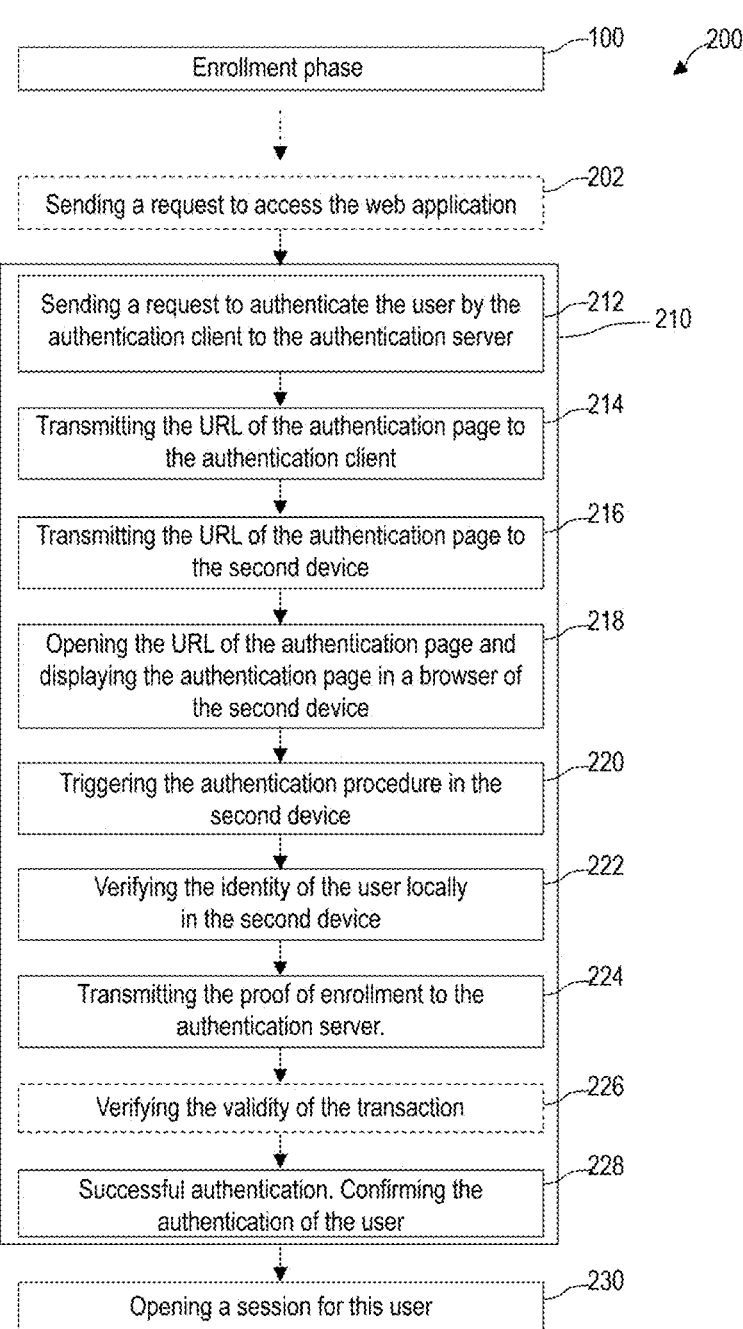
FIG. 2 is a schematic depiction of an authentication method according to one or more embodiments of the invention.

FIG. 2 is a schematic depiction of an authentication method according to one or more embodiments of the invention.

The method 200, depicted in FIG. 2, can be implemented to authenticate a user seeking to access:
- a web application, referred to as remote application, hosted on an application server, with a first user device; or
- a local application installed on said first user device; or even
- said first device, with a view to opening a session on said first device.

The first user device may be any type of user device such as a computer, a tablet, a telephone, a television, etc.

The remote application can be any type of application, such as for example an office suite, a streaming application, an accounting application, etc. It may be hosted on an application server accessible via a communication network such as for example the Internet.

The local application can be any type of application, such as, for example, an office suite, a streaming application, an accounting application, etc. It is installed and running on the first device.

In every case, the method according to at least one embodiment of the invention implements an authentication client, which is provided in software form.

When at least one embodiment of the invention is used to authenticate a user with a view to accessing the first device, or a local application, the authentication client is installed on said first device. As a result, the data exchanged with the authentication client are exchanged with the first device.

When at least one embodiment of the invention is used to authenticate a user with a view to accessing a remote application hosted on an application server, the authentication client is installed on said application server. As a result, the data exchanged with the authentication client are exchanged with the application server.

The method 200 may comprise an optional step 202 of sending an access request, formulated on the first device. Step 202 may or may not be part of the method according to one or more embodiments of the invention, and in particular of the method 200 of FIG. 2.

When at least one embodiment of the invention is used to authenticate a user with a view to accessing the first device, or a local application, said access request step can be carried out via the authentication client installed on said first device.

When at least one embodiment of the invention is used to authenticate a user with a view to accessing a remote application, the access request can be formulated via a web browser running on the first device or a client module installed on the first device.

In every case, the access request is formulated on the first device.

The method 100 according to one or more embodiments of the invention comprises a user authentication phase 210.

As described hereinbefore, according to one or more embodiments of the invention, this authentication phase 210 will be carried out with the cooperation of a second user device that was previously enrolled with an authentication server, for example by the enrollment phase 100 of FIG. 1.

In the case of accessing a remote application hosted on an application server, the authentication server may be the same server as the application server. Subsequently, and without becoming less general, the application server and the authentication server are considered to be different servers which can communicate with one another via a communication network, such as for example the Internet.

The authentication phase 210 comprises a step 212 of sending, to the authentication server, a request to authenticate the user, by the authentication client of the first device or the application.

If the authentication client is located on the first device, the authentication request can be sent directly to said authentication server from said first device.

If the authentication client is located on the application server, the authentication request can be sent to the authentication server from said application server following the receipt of the access request, on behalf of the user.

In every case, the authentication client can propose several authentication options to the user, including that of at least one embodiment of the invention. In this case, the authentication request is sent to the authentication server when the user selects an authentication solution according to at least one embodiment of the invention.

The authentication request may comprise an identifier of the user. The identifier of the user can be entered by the user during the step 202 of sending the access request. Alternatively, the identifier of the user can have previously been stored in the first user device, for example during a previous authentication phase. According to at least one embodiment, the identifier of the user can have previously been stored in the application server, if appropriate, for example during a previous authentication phase.

According to one or more embodiments, the authentication request does not comprise the identifier of the user.

Typically, the authentication request may optionally comprise any combination of the following data:

the identifier of the user, if it is known. An "empty" identifier can also be transmitted;

an attribute defining whether the user who needs to authenticate must be the one corresponding to the transmitted identifier, or if another user can authenticate. The authentication server can systematically transmit the identifier actually used when the user authentication phase 210 is completed. This attribute may be necessary when there is a re-authentication of the user already connected or when the authentication is part of a chained authentication (password authentication followed by mobile authentication, for example);

information of client context, denoted Cxc, for identifying the transaction by the application server or the client application;

textual information for describing the reasons for authentication, server name, application name, and other technical information.

During a step 214, carried out after receiving the authentication request, the authentication server returns a message, referred to as first message, containing:

a URL of a user authentication page;

a transaction identifier, preferably unique and non-reusable, which corresponds to the current authentication transaction; and optionally, the identifier of the user, when it is known.

For example, the URL of the authentication page, the transaction identifier, and the identifier of the user if necessary, can be encoded in a URL, referred to as enriched URL, provided in the form of a character string.

Optionally, the first message may further comprise:

authentication context information, denoted Cxa, in the form of a character string, and which can be used to obtain the result of the authentication, when it is optionally carried out by the second user device; and the possible client context, Cxc, which makes it possible to identify the transaction.

The first message is sent to the authentication client by the authentication server.

If the authentication client is located on the first device, then the first message is sent by the authentication server to the first device.

If the authentication client is located on the application server, then the first message is sent by the authentication server to the application server.

During a step 216, carried out after receiving the first message, the enriched URL, that is, the URL of the authentication page and the transaction identifier, is transmitted to the second user device, previously enrolled with the authentication server.

The enriched URL can be transmitted to the second device by the authentication server, by the application server or by the first device.

The enriched URL can be transmitted to the second device in different ways, such as for example in the form of an email or a telephone message, sent by the first device or the application server.

Advantageously, by way of at least one embodiment, the enriched URL can be transmitted to the second device in the form of a QR code, displayed on a display screen of the first device and scanned/photographed by the second user device.

The QR code can be constructed/encoded by the first device.

Alternatively, in one or more embodiments, the enriched URL can be encoded in a QR code by the authentication server. In this case, the first message may comprise, or consist of, said QR code.

Alternatively, in one or more embodiments, the enriched URL can be encoded in a QR code by the application server and transmitted to the first device by said application server.

During a step 218, the second device opens the enriched URL to access the authentication page, in a web browser running on said second user device. Said URL can be opened manually by the user who clicks on/selects said URL in a message. Alternatively, in one or more embodiments, the opening of said URL can be proposed in an automated manner, or be carried out in an automated manner, for example when the user scans a QR code displayed by the first device and wherein said URL is encoded.

The opening of the enriched URL by in the second user device causes:

the display of the authentication page of the authentication server, in a browser running on the second user device; and the transmission to the authentication server:

of the unique identifier of the authentication transaction, and optionally, of the identifier of the user.

Optionally, in at least one embodiment, the authentication server can verify the validity of the unique identifier of the transaction and only return the content of the authentication page when said identifier is valid.

Optionally, in at least one embodiment, the authentication server obtains data associated with this transaction, namely any combination of the following data:

the identifier of the user to be authenticated, if it is known;

one or more user identifiers recorded by the browser in the form of a secure cookie or from the local storage of the browser;

the obligation (or not) to authenticate this user specifically;

optionally textual data to be displayed in the authentication Web page.

The browser of the second user device displays the authentication page, that is to say, the page associated with the authentication URL generated by the application server following the authentication request. The identifier of the user is inserted into the page by the browser:

because it is transmitted by the authentication server;

because it is present in the URL, for example as a "login_hint";

because the browser of the second device remembers it;

by reading in the data of the local storage of the browser of the second device;

or because it is entered by the user;

Optionally, in at least one embodiment, if the user has several identifiers, they choose one, or they keep the one that is already present in the display of the authentication page.

Optionally, in at least one embodiment, the user verifies the information presented in the page.

During a step 220, the authentication page triggers the user authentication mechanism, and in particular a FIDO or client certificate authentication.

This authentication mechanism requires verification of the identity of the user, by the second device and locally to said second device, to ensure that the user is indeed authorized to use:

the key, or the security certificate;

and more generally the proof of enrollment generated during the enrollment of this device with the authentication server;

stored in said second device.

Thus, during a step 222, a verification of the identity of the user is carried out locally in the second device. The role of this verification is to ensure that the user is known to the second device and is authorized to use the second device. This verification performs a comparison of a security data entered by the user during this verification step with a security data previously stored in said second device.

This security data may be of any type, such as a security code, PIN code, password, facial biometric datum, also referred to as Face-ID, fingerprint, retinal datum, voice datum, etc.

This security data is totally independent of the authentication server, the web application, etc. This security data is not known, and will not be known, by the authentication server.

According one or more embodiments, this security data may correspond to the security data used to unlock the second device.

It is recalled that this verification step 222 aims to verify that the user can use the second device, and therefore that they can use the proof of enrollment stored in said second device.

If the identity of the user has been successfully verified by the second device, then this means that this user is authorized to use the proof of enrollment stored in said second device in order to authenticate with the authentication server. In this case, during a step 224, the authentication protocol, for example the WebAuthn protocol or the SSL protocol, establishes a secure connection between the browser of the second device and the authentication server and transmits the proof of enrollment previously stored in the second device, and optionally the identifier of the user, in a second message. This second message may further comprise contextual data of the verification of the identity of the user, such as for example the verification method, geolocation, etc.

The user is then successfully authenticated with the authentication server.

During an optional step 226, the authentication server can verify that the authentication transaction is still valid and/or that the authenticated user matches the requested user.

During a step 228, the authentication server confirms the authentication of the user to the authentication client. This confirmation is sent to the first device if the authentication client is located on said first device and/or to the application server if the authentication client is located on said application server, in the form of a third message.

This third message comprises an authentication confirmation data. This third message may further comprise any combination of the following data:

the identifier of the authenticated user, in particular if it is not already known from the first device or the application server;

data obtained from the browser of the second device, such as for example the type of browser, IP address and geolocation if available, etc.: these data may be or comprise data found in the second message transmitted by the second device to the first device;

data relating to the client context Cxc etc.

After receiving the third message with the authentication confirmation data, the authentication phase 210 ends. The access requested by the user is authorized. During a step 230, the session of the user corresponding to the user identifier is started: it is either a session for accessing the first device, or a session of a local application, or even a session of a remote application. This session is started by implementing the techniques that are specific, respectively:

to the first device, in the case of accessing said device;

to the local application in the case of accessing said local application, to the application server(s):

The access technique may be any type of technique, for example an access technique using a session cookie, a token, an OAuth protocol, etc.

The method 200 may further comprise at least one iteration of an enrollment phase, such as for example the enrollment phase 100 of FIG. 1, to enroll a user device as second device.

The enrollment phase 100 can be carried out just before an authentication phase, or else independently of the performance of an authentication phase.

Figure 3:
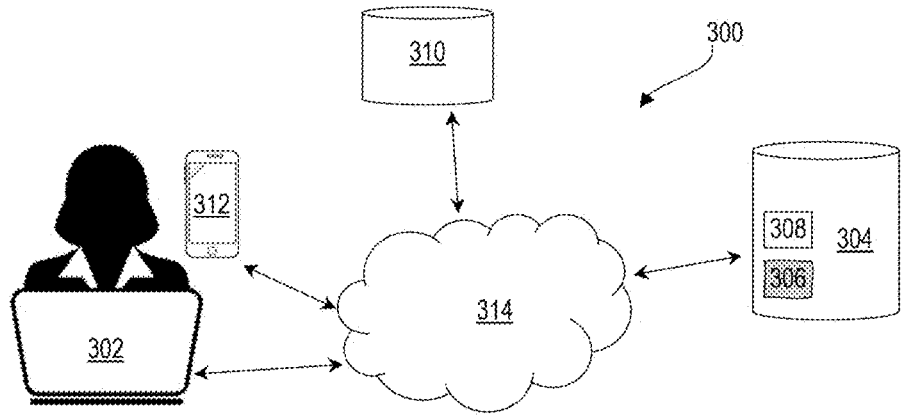
FIG. 3, FIG. 4 and FIG. 5 are schematic depictions of three examples of an authentication system according to one or more embodiments of the invention.

FIG. 3 is a schematic depiction of an authentication system according to one or more embodiments of the invention.

The system 300, depicted in FIG. 3, can be implemented to authenticate a user seeking to access a web application, also referred to as remote application, by a web browser or a client application.

The system 300 comprises at least a first device 302, which may be any type of smart device such as a television, a computer, a tablet, a car, etc.

The system 300 further comprises an application server 304 accessible by the first device 302 via a communication network. This application server 304 hosts the web application 306 which the user seeks to access, and an authentication client 308.

The system 300 further comprises an authentication server 310 for authenticating the user and determining whether or not the user is entitled to access the web application 306.

Finally, the system comprises a second device 312, which can be any type of smart device such as a tablet, a smartphone, etc. capable of running a web browser.

The first device 302, the application server 304, the authentication server 310, and the second device 312 are connected to a communication network 314, for example the Internet, in order to communicate with one another.

The system 300 is configured to implement the steps of the method according to one or more embodiments of the invention, and in particular the method 200 of FIG. 2, when it is used to authenticate a user with a view to accessing a remote application.

In the example depicted, by way of at least one embodiment, the application server 304 and the authentication server 310 are independent. According to at least one embodiment, the application server 304 and the authentication server 310 can be the same server.

In addition, preferably the first device 302 and the second device 312 are located on the same site. Of course, according to at least one embodiment, the first device 302 and the second device 312 can be located on different sites.

Figure 4:
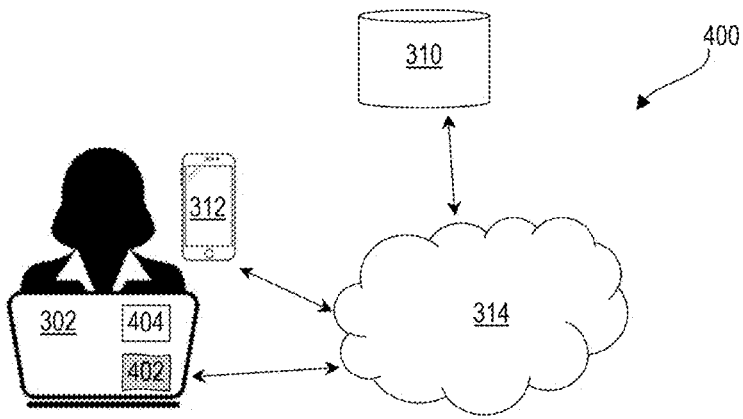

FIG. 4 is a schematic depiction of an authentication system according to one or more embodiments of the invention.

The system 400, depicted in FIG. 4, can be implemented to authenticate a user seeking to access a local application.

The system 400 comprises all the elements of the system 300 of FIG. 3, except for the application server 304.

In particular, the system 400 comprises the first device 302 running a local application 402 which the user seeks to access.

The first device also comprises an authentication client 404, managing access to the local application 402.

The system 400 further comprises the authentication server 310 for authenticating the user and determining whether or not the user is entitled to access the web application 402.

Finally, the system comprises a second device 312, which can be any type of smart device such as a tablet, a smartphone, etc. capable of running a web browser.

The system 400 is configured to implement the steps of the method according to one or more embodiments of the invention, and in particular the method 200 of FIG. 2, when it is used to authenticate a user with a view to accessing a local application.

Figure 5:
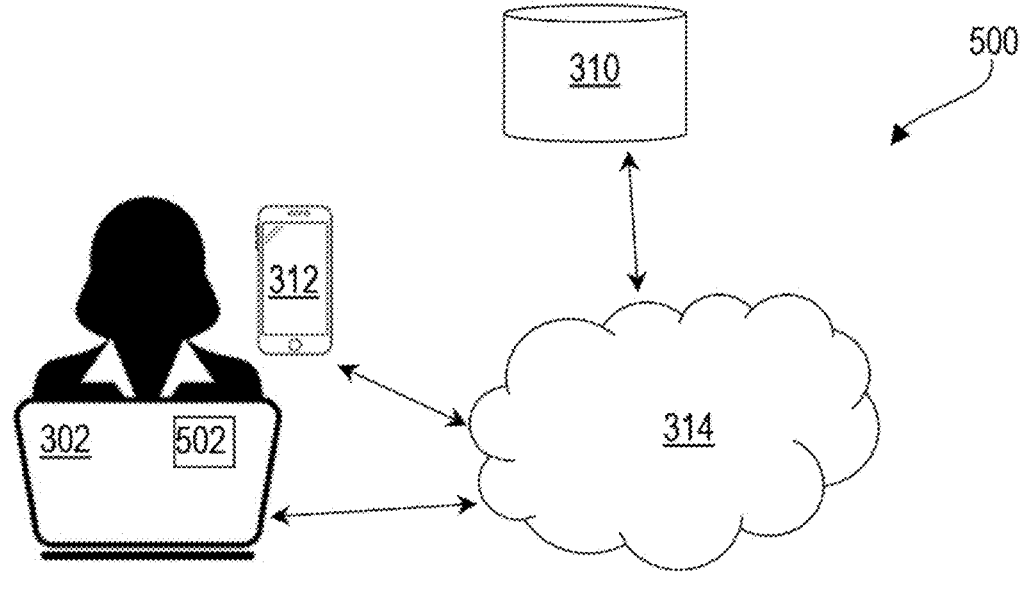

FIG. 5 is a schematic depiction of an authentication system according to one or more embodiments of the invention.

The system 500, depicted in FIG. 5, can be implemented to authenticate a user seeking to access a device, that is to say, to open a session on said device.

The system 500 comprises all the elements of the system 400 of FIG. 4, except for the local application 402 and the authentication client 404 of the local application.

In particular, the system 500 comprises the first device 302.

The first device 302 comprises an authentication client 502, managing the access to said first device 302, that is to say, to open a session on said device.

The system 500 further comprises the authentication server 310 for authenticating the user and determining whether or not the user is entitled to access the device 302.

Finally, the system comprises a second device 312, which can be any type of smart device such as a tablet, a smartphone, etc. capable of running a web browser.

The system 500 is configured to implement the steps of the method according to one or more embodiments of the invention, and in particular the method 200 of FIG. 2, when it is used to authenticate a user with a view to accessing the first device 302.

Of course, these examples are only given as specific examples and the at least one embodiment of the invention is not limited to the examples given above. Numerous variants can be envisaged for the examples given above without departing from the scope of one or more embodiments of the invention as defined in the main claims.

The invention claimed is:

1. A method for authenticating a user with an authentication server, in order to access a first user device or an application with said first user device, said method comprising:

at least one iteration of an authentication phase, wherein said authentication phase comprises sending, by a processor of said first user device executing an authentication client configured to communicate with said authentication server, an authentication request, in response to said authentication request, sending by the authentication server a first message comprising an authentication URL and a transaction identifier to a second user device, opening said authentication URL in a web browser running on a on said second user device, previously enrolled with said authentication server, verifying an identity of said user by said second user device, and when said verifying is successful, providing by said second user device to said authentication server, a proof of enrollment stored in said second user device during enrollment of said second user device, in order to authenticate said user.

2. The method according to claim 1, further comprising, before the at least one iteration of the authentication phase, enrolling the second user device with the authentication server in association with the user, said enrolling producing a proof of enrollment stored in said second user device.

3. The method according to claim 2, when said enrolling performs a Fast Identity Online (FIDO) type enrollment with the authentication server, a private key of which is recorded in the second user device; or an X509 client certificate type enrollment, wherein one or more of a name and a serial number of which are recorded in the authentication server, and wherein a private key of which is recorded in the second user device.

4. The method according to claim 2, wherein the enrolling comprises storing, in said second user device, an identifier of said user.

5. The method according to claim 2, wherein the enrolling is carried out via an enrollment web page open in a browser running on the second user device.

6. The method according to claim 1, wherein the authentication URL and the transaction identifier are transmitted to the second user device by the first user device.

7. The method according to claim 1, wherein the sending of the authentication URL and the transaction identifier to the second user device is carried out via a QR code displayed by the first user device and scanned by said second user device.

8. The method according to claim 1, wherein said verifying the identity of the user by the second user device comprises providing, by said user to said second user device, a security data previously stored in said second user device, wherein said security data comprises a password or a biometric data, to unlock said second user device.

9. The method according to claim 1, wherein the authentication phase further comprises, after successful verification of the identity of the user by the second user device, sending by said second user device to said authentication server a second message, wherein said second message comprises the transaction identifier, the proof of enrollment stored in said second user device, and optionally, one or more of a user identifier and a proof of verification.

10. The method according to claim 1, wherein the authentication phase further comprises, after a successful authentication, confirming authentication by the authentication server, comprising sending by said authentication server to the authentication client a third message comprising an authentication confirmation data and optionally an identifier of the user.

11. The method according to claim 1, further comprising, following the authentication phase, opening a session of the web browser for the user on an application server, in an event of successful authentication.

12. A non-transitory computer program comprising computer instructions, which when executed by a computer, implement a method for authenticating a user with an authentication server, in order to access a first user device or an application with said first user device, said method comprising:

at least one iteration of an authentication phase, wherein said authentication phase comprises sending, by a processor of said first user device executing an authentication client configured to communication with said authentication server, an authentication request, in response to said authentication request, sending by the authentication server a first message comprising an authentication URL and a transaction identifier to a second user device, opening said authentication URL in a web browser running on said second user device, previously enrolled with said authentication server, verifying an identity of said user by said second user device, and when said verifying is successful, providing by said second user device to said authentication server, a proof of enrollment stored in said second user device during enrollment of said second user device, in order to authenticate said user.

13. A system for authenticating a user with an authentication server, in order to access a first user device or an application with said first user device, said system comprising:

the first user device, the authentication server, a second user device comprising a web browser; and a processor configured to execute an authentication client;

configured to implement a method for authenticating the user with the authentication server, in order to access the first user device or the application with said first user device, said method comprising at least one iteration of an authentication phase, wherein said authentication phase comprises sending, by said processor executing the authentication client configured to communicate with said authentication server, an authentication request, in response to said authentication request, sending by the authentication server a first message comprising an authentication URL and a transaction identifier to the second user device, opening said authentication URL in the web browser running on the second user device, previously enrolled with said authentication server, verifying an identity of said user by said second user device, and when said verifying is successful, providing by said second user device to said authentication server, a proof of enrollment stored in said second user device during enrollment of said second user device, in order to authenticate said user.

\* \* \* \* \*